UNITED STATES PATENT OFFICE.

SADAKICHI SATOW, OF SENDAI, JAPAN.

LACQUER AND PROCESS OF MAKING THE SAME.

1,245,981.      Specification of Letters Patent.      Patented Nov. 6, 1917.

No Drawing.      Application filed December 30, 1916. Serial No. 139,889.

*To all whom it may concern:*

Be it known that I, SADAKICHI SATOW, a subject of the Emperor of Japan, residing at Sendai, Japan, have made a certain new and useful Invention in Lacquers and Processes of Making the Same, of which the following is a specification.

This invention relates to lacquer and process of making the same.

The object of the invention is to utilize vegetable proteids in the manufacture of lacquer, and to produce therefrom a lacquer of any desired color, and which, when applied to a surface and dried, imparts a strong glossy coating which resists the action of water, acids, alkalis, and organic solvents, as well as variations in weather conditions, heat or cold, and which affords an efficient insulator for electricity.

Other objects of the invention will appear more fully hereinafter.

In carrying out my invention I employ vegetable proteids or proteidal substances, such as are obtained from suitable proteid containing material. The proteids or proteidal substances are treated with a suitable glutinizing agent, and the resulting compound is condensed with a suitable condensing agent.

The proteids or proteidal substances employed in carrying out my invention are obtained in any suitable manner from any suitable raw material which contains vegetable proteids, such as beans, peas, wheat, corn, or other leguminous, cereal or grain products.

The proteid containing raw material is crushed to break down the cellular structure thereof, and if the material employed contains an undesirable percentage of oil, the oil content is removed. This may be effected in any suitable manner, as, for example, by treating the mass with an oil solvent such as benzin. The oil solvent is then removed from the mass. The proteidal substances contained in the "meal", or "proteid meal", thus produced, are separated therefrom to produce a refined proteid product. This separation of the proteidal substances from the proteid meal may be effected in various ways. According to one method the "meal" is treated with an alkaline solution, such as a dilute solution of caustic or carbonated alkali, or caustic or carbonated ammonia, and the proteidal substances, either with or without further purification of the resulting liquid, are precipitated therefrom. The further purification referred to may be accomplished by filtration, centrifuging or the like, by fractional precipitation, fractional solution of precipitated impure proteids, or by converting one or more components into other chemical compounds having different properties which enable their separation, or one or more of these various purifying methods may be employed in combination with the others. The precipitation of the refined proteidal substances is acomplished by adding a suitable acid such as sulfuric, sulfurus, acetic or phosphoric, or by adding a suitable ferment such as lactic or acetic.

According to another method the "meal" is treated with water and the refined proteidal products are precipitated out of the resulting liquid, either with or without purification thereof, as above explained, the precipitation being effected with an acid or a ferment as above described.

According to still another method the meal is treated with an aqueous salt solution, such as sodium chlorid, ammonium sulfate, or the like, and the resulting liquid, either with or without further purification, as explained, is subjected to dialysis.

The vegetable proteids or proteidal substances, obtained as above described, whether in the form of a dry powder, or a moistened cake, are subjected to the action of a suitable acid to act thereon as a glutinizing agent. I have found that a phenol, such as carbolic acid, cresol, or the like, will well answer the purpose.

When vegetable proteids of the character which are soluble in a phenol are mixed with such an agent, and owing to the amphoteric property of the proteid, the phenol combines with the proteids which pass into solution and forms a complex salt. When such combination takes place at the proper temperature sudden chemical changes occur in the mass and a liquid glue-like substance of transparent light brown color, and possessing great adhesiveness, will be obtained. Care should be taken to effect the combination at the proper temperature because if the temperature is not at the right degree the result is a substance which possesses very little adhesive property. Particularly is this true in the case of glycinin. The chemical changes effected when the proper temperature is observed are especially remarkable when the glycinin contains a suitable proportion of water.

The glutinized mass obtained as above described is mixed with a suitable condensing agent, such as an active methylene compound, and I have found that formaldehyde well answers the purpose, although trioxymethylene, hexamethylenetetramin, and the like, may be employed. The condensing agent is mixed with the mass. Instantly with the addition of the condensing agent a remarkable chemical change takes place. The liquid adhesive glue-like substance is transformed into a jelly-like mass. After a few seconds, however, with the mixing operation continued, the mass resumes its liquid form, and its adhesive characteristic, which was reduced by the sudden chemical action referred to, is restored. Ordinarily when a phenol is combined with formaldehyde or other active methylene compound, in the presence of a catalyzer, such as ammonia, caustic soda, or sulfuric acid, water results by the chemical condensations of the phenol and formaldehyde. When, however, the phenol is first combined with proteids in accordance with my invention, and as above described, the character of the resulting mass is chemically changed and no condensation of phenol and formaldehyde molecules to form water takes place. Consequently I entirely avoid the use of a catalyzer in producing the lacquer of my invention. Not only do I eliminate the use of a catalyzer but I also dispense with the necessity of employing high temperatures or high pressures in the manufacture of my product as the same is produced at atmospheric pressure and room temperature and hence I am enabled to greatly reduce the cost of manufacture and at the same time produce a very superior liquid substance for use as a lacquer.

The product of my invention is not freely miscible with any of the common organic solvents, but presents certain peculiar phenomena with certain kinds of solvents, such as benzole, petroleum-benzin, and the like. For example, when my product is mixed with a suitable quantity of such solvent, a free mixture takes place up to a certain critical limit, depending upon the nature of the solvent, and resulting in reducing the mass to a more liquid state. If, however, there is an excess of solvent, this critical limit is exceeded and the mass is turned into a jelly-like condition, and loses its adhesive property. If this jelly-like mass is permitted to stand and the excess of solvent thereby permitted to evaporate, or is otherwise removed, until the critical limit is again restored, then the mass resumes its original liquid and adhesive condition. Consequently by employing a suitable solvent and varying the quantity thereof I am enabled to control or vary the proper degree of consistency of the lacquer to permit it to be applied easily and readily as a lacquer or other coating or film to any desired surface.

The mass produced in accordance with my invention also mixes fairly well with nitro-benzole, anilin, carbontetrachlorid, chloroform, oleic acid, and the like and hence these agents may serve to control the consistency of the final product. The mass, however, does not mix with acetone, ether, alcohols, and water.

My invention may be illustrated by the following examples:—

Example 1: Mix 100 parts by weight of the proteid of soja bean with 250 to 400 parts by weight of cresol. This mass is then kneaded at a temperature of from 30° to 50° centigrade and at ordinary atmospheric pressure, producing a thick glue-like transparent liquid of light brown color having the properties of acid glycinin. This liquid is then kneaded with 80 parts by weight of formalin.

Example 2: Mix 100 parts by weight of the proteid of corn with 150 parts by weight of carbolic acid. This mass is then kneaded at ordinary room temperature and atmospheric pressure, producing a thick glue-like transparent substance of light brown color, having the properties of acid zein. This mass is then thoroughly kneaded with 50 parts by weight of trioxymethylene. To the resulting mass is added 80 to 90 parts by weight of petroleum benzin.

If a transparent colored lacquer is desired, any suitable anilin dye may be mixed into the lacquer; and if non-transparent colored lacquer is desired, any suitable pigment may be kneaded with the mass before the organic solvent is added thereto.

If the lacquer product of my invention is applied to the surface of wood, bamboo, stone, earthenware, glass, cement, metal, paper-board, and the like and left for a period of from 3 to 4 hours in a temperature of from 30 to 40 degrees centigrade, it hardens and gives a glossy, nearly colorless coating which will not peel off, is not affected by water, color or heat, is unaffected by common organic solvents, possesses a great resisting power to the action of strong acids and alkalis, except concentrated nitric acid which changes it to a yellow color in a few minutes and sets up a gradual decomposing action. My lacquer shows no change even when heated to 150° C. A surface coated with it takes on a high degree of polish when rubbed over with a suitable polishing agent such as iron oxid. For ornamental purposes the lacquer may be applied with facility to stone or concrete to produce facing tile, or ornamental cornices of regular or irregular shape, or to glass to produce stained glass effects. As it possesses great adhesive power it may also be used as a cement. It is a good insulator of electricity. If any suitable fibrous material is saturated with the lacquer and dried a most efficient electrical insulator sheet is produced. Boards or blocks may be molded out of the substance itself and used for various purposes.

Having now set forth the objects and nature of my invention and various methods of carrying the same into practical operation, what I claim as new and useful and of my own invention and desire to secure by Letters Patent is:—

1. In the manufacture of lacquer the process which consists in glutinizing vegetable proteids with a phenolic agent, and then treating the mass with an active methylene compound.

2. In the manufacture of lacquer, the process which consists in glutinizing vegetable proteids into a liquid adhesive glue-like mass with a phenol, and then treating such mass with an active methylene compound.

3. In the manufacture of lacquer, the process which consists in glutinizing vegetable proteids with a phenol to produce a liquid adhesive glue-like mass, and then treating such mass with an active methylene compound and reducing the resulting product to the desired consistency with a solvent.

4. In the manufacture of lacquer, the process which consists in glutinizing vegetable proteids into a liquid adhesive glue-like mass with a phenol, and treating such mass with an active methylene compound and controlling with benzole the consistency of the resulting mass.

5. In the manufacture of lacquer, the process which consists in glutinizing vegetable proteids into a liquid adhesive glue-like mass with a phenol, and treating such mass with an active methylene compound and controlling with benzole the consistency of the resultiing mass and adding an anilin dye.

6. In the manufacture of lacquer, the process which consists in glutinizing vegetable proteids into a liquid adhesive glue-like mass with a phenol, and treating such mass with formaldehyde and controlling with benzole the consistency of the resulting mass.

7. In the manufacture of lacquer, the process which consists in glutinizing vegetable proteids with a phenolic agent to convert the same into a liquid adhesive glue-like mass, and treating such mass with a condensing agent.

8. In the manufacture of lacquer, the process which consists in glutinizing vegetable proteids with a phenolic agent to convert the same into a liquid adhesive glue-like mass, and treating such mass with formaldehyde.

9. In the manufacture of lacquer, the process which consists in glutinizing vegetable proteids with a phenolic agent to convert the same into a liquid adhesive glue-like mass, and treating such mass with a condensing agent and controlling with a solvent the consistency of the resulting mass.

10. In the manufacture of lacquer, the process which consists in glutinizing vegetable proteids with a phenolic agent to convert the same into a liquid adhesive glue-like mass, and treating such mass with an active methylene compound and controlling with a solvent the consistency of the resulting mass and adding an anilin dye.

11. In the manufacture of lacquer, the process which consists in glutinizing vegetable proteids with a phenolic agent to convert the same into a liquid adhesive glue-like mass, and treating such mass with formaldehyde and controlling with a solvent the consistency of the resulting mass.

12. In the manufacture of lacquer, the process which consists in glutinizing vegetable proteids with a phenol to convert the same into a liquid adhesive glue-like mass and subjecting such mass to the action of formaldehyde and controlling with a solvent the consistency of the resulting mass, and adding an anilin dye.

13. In the manufacture of lacquer, the process which consists in glutinizing vegetable proteids with cresol and subjecting the resulting mass to the action of a condensing agent.

14. In the manufacture of lacquer, the process which consists in glutinizing vegetable proteids with cresol and subjecting the resulting mass to the action of a condensing agent and reducing the final product to the desired consistency.

15. In the manufacture of lacquer, the process which consists in glutinizing vegetable proteids with cresol and subjecting the resulting mass to the action of a condensing agent and controlling with benzole the consistency of the resulting mass.

16. In the manufacture of lacquer, the process which consists in glutinizing vegetable proteids with cresol and subjecting the resulting mass to the action of an active methylene compound.

17. In the manufacture of lacquer, the process which consists in glutinizing vegetable proteids with cresol and subjecting the resulting mass to the action of formaldehyde.

18. In the manufacture of lacquer, the process which consists in glutinizing vegetable proteids with cresol and subjecting the resulting mass to the action of an active methylene compound and controlling with a solvent the consistency of the resulting mass.

19. In the manufacture of lacquer, the process which consists in glutinizing vegetable proteids with cresol and subjecting the resulting mass to the action of formaldehyde and controlling with benzole the consistency of the resulting mass.

20. In the manufacture of lacquer, the process which consists in glutinizing vegetable proteids with cresol and subjecting the resulting mass to the action of formaldehyde and controlling with a solvent the consistency of the resulting mass.

21. In the manufacture of lacquer, the process which consists in glutinizing vegetable proteids with cresol and subjecting the resulting mass to the action of an active methylene compound and controlling with benzole the consistency of the resulting mass.

22. As a new article of manufacture lacquer containing a condensation product of glutinized vegetable proteid with an active methylene compound and benzole.

23. As a new article of manufacture lacquer containing a condensation product of glutinized vegetable proteid with formaldehyde and benzole.

24. As a new article of manufacture lacquer containing a condensation product of vegetable proteids and a phenol, with an active methylene compound.

25. As a new article of manufacture lacquer containing a condensation product of vegetable proteids and a phenol with an active methylene compound, and a solvent.

26. As a new article of manufacture lacquer containing a condensation product of vegetable proteids glutinized by a phenol, with an active methylene compound, a solvent and a coloring matter.

27. As a new article of manufacture lacquer containing glutinized vegetable proteids, a phenol and an active methylene compound.

28. As a new article of manufacture, lacquer containing glutinized vegetable proteids, a phenol and formaldehyde.

29. As a new article of manufacture, lacquer containing glutinized vegetable proteids, cresol, formaldehyde and a solvent.

30. As a new article of manufacture, lacquer containing glutinized vegetable proteids, a phenol, an active methylene compound and benzole.

In testimony whereof I have hereunto set my hand on this 23rd day of December A. D., 1916.

SADAKICHI SATOW.